Sept. 17, 1957 J. W. SCHELL 2,807,020
METHOD OF MAKING CAPACITORS
Filed Dec. 16, 1954

INVENTOR.
John W Schell
BY
Ralph Hammar
attorney

United States Patent Office 2,807,020
Patented Sept. 17, 1957

2,807,020

METHOD OF MAKING CAPACITORS

John W. Schell, Erie, Pa., assignor to Erie Resistor Corporation, Erie, Pa., a corporation of Pennsylvania Application December 16, 1954, Serial No. 475,703

1 Claim. (Cl. 51—281)

Ceramic electrical condensers or capacitors consist of a thin-walled ceramic dielectric having electrodes on opposite surfaces which heretofore have been applied to the individual dielectric pieces with the edge portions of the dielectric masked so as to provide an insulating band of ceramic separating the electrodes. This has required individual handling of the ceramic pieces. This invention is intended to eliminate the individual handling of the ceramic pieces by a process in which the entire surface of the ceramic pieces may be coated with metal and then the metal coatings at the edges removed in an abrasive tumbling operation. This permits the manufacture of condensers in large batches without any separate handling of individual pieces. The abrasive tumbling operation uses a tumbling barrel with an internal surface contacting the outer edges of the ceramic at an angle so that the outer metal coating and the underlying ceramic is ground or abraded away to produce a bevelled outer edge. The operation is adapted to both the disk and tubular capacitors.

Figure 1:
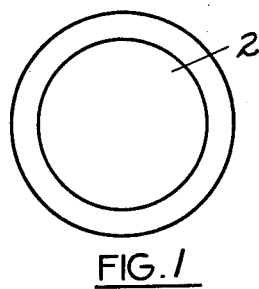
Figure 3:
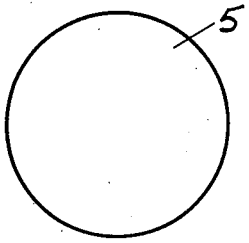
Figure 6:
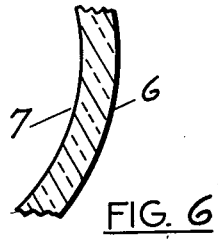
Figure 2:
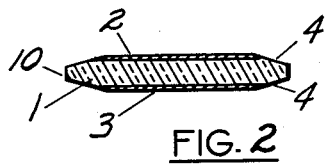
Figure 4:
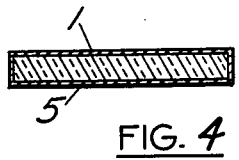
Figure 7:
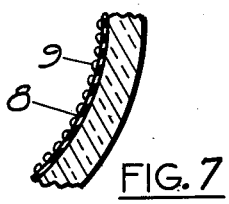
Figure 5:
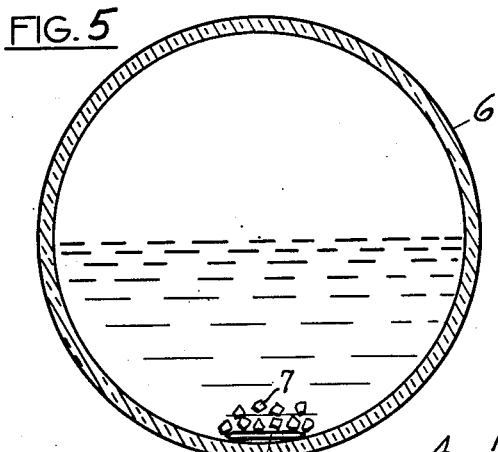
Figure 11:
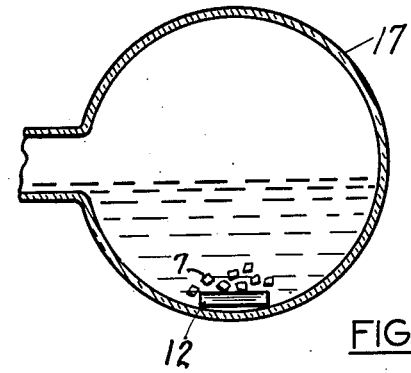
Figure 8:
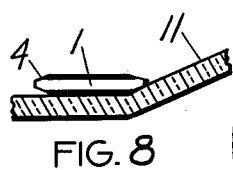
Figure 12:
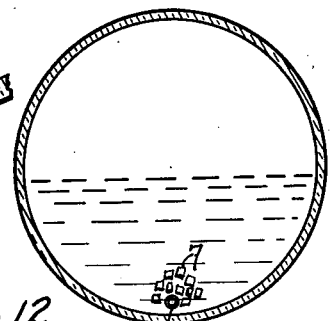
Figure 10:
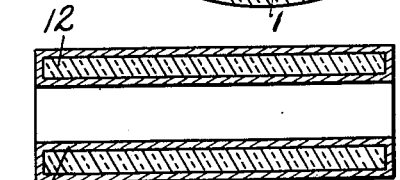
Figure 9:
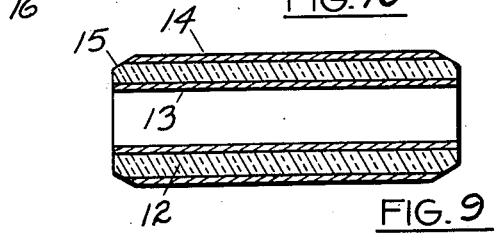

In the drawing, Fig. 1 is a plan view of a disk ceramic capacitor, Fig. 2 is a section through the disk capacitor, Fig. 3 is a plan view of the disk capacitor at the end of the metal coating operation, Fig. 4 is a section through the disk capacitor at the end of the metal coating operation, Fig. 5 is a transverse section through a cylindrical tumbling barrel for removing the metal coating from the edges of the ceramic so as to produce the finished capacitor of Figs. 1 and 2, Fig. 6 is a fragmentary section through the wall of the tumbling barrel of Fig. 4, Fig. 7 is a fragmentary section through another form of wall of the tumbling barrel of Fig. 5, Fig. 8 is a fragmentary section through another form of tumbling barrel where the wall is made up of a plurality of sides rather than a cylindrical surface, Fig. 9 is a longitudinal section through a tubular ceramic capacitor, Fig. 10 is a similar longitudinal section through the tubular capacitor of Fig. 9 at the end of the metal coating operation, Fig. 11 is a longitudinal section through spherical tumbling barrel for removing the metal coatings from the ends of the tubular ceramic capacitors, and Fig. 12 is a transverse section through the Fig. 11 tumbling barrel.

As shown in Figs. 1 and 2, the disk ceramic capacitor comprises a disk 1 of ceramic on opposite faces of which are metal electrodes 2 and 3 which may be applied by the techniques used in the decoration of ceramics. The electrodes 2 and 3 occupy the center portions of the disk 1 and at the outer edge the disk has bevelled surfaces 4 which are entirely free of metal coatings and which provide an insulating band between the electrodes 2 and 3. Except for the bevelled surfaces 4, the disk capacitor is or may be of common construction. Most usually the electrodes 2 and 3 will be of silver or copper and the ceramic 1 will be of one of the high dielectric constant ceramics having a dielectric constant running up to many thousand.

Heretofore, the electrode coatings 2 and 3 have been applied by masking the outer edges of the disk during the metal coating operation so that paint was kept off the outer edges which provide the insulating band between the electrodes.

In accordance with the present technique, the entire outer surface of the ceramic disk 1 has a metal coating 5 applied thereto covering not only the opposite faces but also the edges so that the ceramic disk 1 is completely enclosed or encased by the metal coating 5. At the end of the metal coating operation, the ceramic is not usable as a condenser because there are no separate metal electrodes across which the capacitance is obtained. However, because no care need be taken to keep the metal coating off portions of the ceramic disk, the application of the continuous or complete metal coating 5 is adapted to batch processing and does not require handling of individual pieces as in the prior methods of manufacture where the parts of the ceramic disk on which metal coatings were not wanted were masked so as to keep the metal coatings off.

In order to make the metal coated ceramic pieces such as shown in Figs. 3 and 4 usable as capacitors it is necessary that the parts of the metal coating 5 covering the outer edge portions of the ceramic disks 1 be completely removed so as to provide the insulating band. The removal of the metal coatings at the outer edges of the disk should be by a process which does not appreciably remove the metal coatings at the centers of the disk so that at the end of the removal operation the metal coated dielectric will have the structure illustrated in Figs. 1 and 2.

In order to remove the metal coating 5 from the edges of the ceramic disk 1, a batch of the metal coated ceramic disks are loaded into a cylindrical tumbling barrel 6 together with some of the hard particles 7 conventionally used in tumbling operations and a supply of abrasive grit. The dry pieces are usually loaded so as to substantially half-fill the tumbling barrel and the barrel is then filled with water to substantially the same point. The degree of loading of the tumbling barrel is not critical but the operation is usually more economical if the tumbling barrel is approximately half-filled.

The tumbling barrel preferably has an abrasive inner surface which may, for example, consist of unglazed ceramic 7 as shown in Fig. 6 or may consist of an abrasive coating comprising a plastic 8 with adherent abrasive particles 9. The inner surface shown in Fig. 7 is in effect a sandpaper surface. Another way of providing an abrasive inner surface for the tumbling barrel 6 would be to make the entire tumbling barrel of silicon carbide.

In the tumbling action the edges of the metal coated ceramic disks are abraded away primarily by sliding of the disks relative to the rotating inner surface of the tumbling barrel. The disks are held against the inner surface of the barrel in part by the force of gravity and in part by the honing particles 7. Because the tumbling barrel is rotated at a speed lower than that at which centrifugal force would exceed the force of gravity, there is a continual slippage between the disks and the inner surface of the tumbling barrel. There is also the usual internal circulation of disks and other material within the barrel which continually redistributes the disks throughout the mass of liquid and solid particles and gives each of the separate disks in the mass a chance to come into sliding abrasive contact with the inner surfaces of the tumbling barrel. The abrasive particles added to the mass assist in the abrasive action.

As will be apparent from Fig. 5 where only one of the disks and a few of the honing particles 7 are shown, the internal diameter of the tumbling barrel should be related to the outside diameter of the ceramic disks so that the disks lie chordwise against the inner surface of the tumbling barrel and have their greatest abrading contact at the outer edges. This keeps the metal coating at the center of the disk relatively free from abrasive contact and confines the abrading action to the outer periphery of the disk. As a result of this abrading action, the edges are bevelled as indicated at 4 in Fig. 1. The knocking of the disks against each other and against the honing particles 7 readily and quickly removes the paint from the outer cylindrical surfaces 10 of the ceramic disks. If the abrading action is continued long enough, the bevelled surfaces 4 will intersect and as the abrading action is continued the diameter of the ceramic disks will be decreased with a corresponding decrease in the diameter of the electrode coatings 2 and 3. The length of tumbling accordingly determines the area of the electrode coatings 2 and 3. Because of the inherent redistribution of the ceramic disks throughout the tumbling mass as a part of the ususal tumbling operation, the abrading action removing the paint from the outer edges of the ceramic disks takes place very uniformly and the area of electrode coating remaining on each of the ceramic disks at the end of the tumbling operation has very little variation from piece to piece.

As a guide in the construction of the tumbling barrel for ceramic disks of ¾ inch outside diameter, the inside diameter of the tumbling barrel 6 should be approximately 5 inches. With this size tumbling barrel, the honing particles 7 may be "Honite" No. 5 and the abrasive particles added to increase the abrasive action can be aluminum oxide. For a smaller diameter of disks, the internal diameter of the tumbling barrel 6 is preferably decreased and for larger diameter disks the internal diameter is correspondingly increased.

Instead of using a circular internal surface for the tumbling barrel as shown in Fig. 5, a multi-sided polygonal tumbling barrel may be used as diagrammatically indicated in Fig. 8. As there shown, the tumbling barrel is made up of a plurality of axially extending surfaces 11 which are inclined to each other at approximately the bevel angle for the bevelled surfaces 4 at the outer edges of the ceramic disks. With this polygonal or multi-sided internal surface, there is the same slipping action between the inner surface of the tumbling barrel and the disks and the bevel edges tend to be abraded at essentially the angle between the sides 11 of the tumbling barrel. This abrades away primarily the outer edges of the ceramic disk leaving the electrode coatings 2 and 3 at the center of the disk. With the multi-sided tumbling barrel there may be slightly more abrasion of the center parts of the metal coating but there is still a predominant abrading action at the edges.

When the tumbling barrel of Fig. 5 is used with tubular shaped capacitors instead of disk shaped capacitors, the tubes tend to line up with their axes parallel to the axis of rotation of the tumbling barrel and there is little or no abrading action. For tubular shaped capacitors as shown in Figs. 9 and 10, a spherical tumbling barrel as shown in Figs. 11 and 12 should be used.

The tubular capacitor as shown in Fig. 9 comprises a tubular ceramic dielectric 12 having an inner electrode coating 13 on its bore and an outer electrode coating 14 on its outer surface. At the ends of the dielectric there are bevelled surfaces 15 having no metal coating thereon which provide the insulating band between the inner and outer electrode coatings 13 and 14.

In order to make the Fig. 9 tubular ceramic capacitors without taking pains to keep paint off the surfaces 15, the tubular ceramic 12 as shown in Fig. 10 has applied over its entire inner, outer and end surfaces a metal coating 16. In the stage of manufacture shown in Fig. 10, a tube cannot be used as a condenser because there are no separate electrode coatings. In order to remove the metal coating 16 preferentially at the end surfaces of the ceramic tubes 12, a batch of ceramic tubes completely coated with the metal coating 16 is loaded into a tumbling barrel 17 together with the honing particles 7 and abrasive grit as in the previously described tumbling barrel for the disk capacitors. The tumbling barrel is usually loaded about half full of the dry ingredients and the interstices filled with water so that the metal coated ceramic tubes, the honing particles 7 and the abrasive grit are dispersed in the water to make a fluid mud or slip. Only one of the metal coated ceramic tubes and only a few of the honing particles 7 are illustrated in Fig. 11. As the tumbling barrel 17 is rotated on its axis the metal coated ceramic tubes tend to line up generally parallel with the axis of rotation of the tumbling barrel although there will, of course, be the usual redistribution of the contents of the tumbling barrel during its rotation. As shown in Fig. 11, the metal coated ceramic tubes will contact the spherical inner walls of the tumbling barrel 17 generally chordwise so that the abrading action takes place preferentially at the ends of the tubes producing the bevelled end surfaces illustrated at 15 in Fig. 9. The abrading action takes place by a relative slippage between the inner surface of the tumbling barrel 17 and the tubular ceramic elements, since the tumbling barrel is rotated at a speed at which centrifugal force is less than the force of gravity. The honing particles 7 are substantially thicker than the wall of the dielectric and are shaped to engage only a minor part of the exposed surface so that the abrading action other than at the edges is minimized.

What is claimed as new is:

The method of bevelling the outside end edges of elongated cylinders which comprises loading a charge of liquid and abrasive particles and a plurality of cylinders into a sperical container wtih the cylinders free to move about within the container with the interstices between the cylinders and abrasive particles filled with liquid so that the cylinders and abrasive particles are dispersed in the liquid to make a fluid slip, said container having a radius of curvature such that the cylinders lying chordwise at any orientation on the inner surface of the container contact the inner surface of the container at the desired angle of bevel, and rotating the container at a speed at which centrifugal force is less than the force of gravity causing relative slippage between the container and the cylinders abrading the outside end edges of the cylinders and effecting a random redistribution of the cylinders within the container with no maintained pattern of alignment with each other or with the container.

References Cited in the file of this patent

UNITED STATES PATENTS

| | | |
|---|---|---|
| 1,517,462 | Rockwell | Dec. 2, 1924 |
| 2,387,141 | Fruth | Oct. 16, 1945 |
| 2,585,752 | Dorst | Feb. 12, 1952 |
| 2,617,238 | Spindt | Nov. 11, 1952 |
| 2,664,675 | La Monica | Jan. 5, 1954 |